US008543280B2

(12) United States Patent
Ghimire et al.

(10) Patent No.: US 8,543,280 B2
(45) Date of Patent: Sep. 24, 2013

(54) COLLABORATIVE MULTI-AGENT VEHICLE FAULT DIAGNOSTIC SYSTEM AND ASSOCIATED METHODOLOGY

(75) Inventors: Sandesh Ghimire, Ann Arbor, MI (US); Danil Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 245 days.

(21) Appl. No.: 13/097,703

(22) Filed: Apr. 29, 2011

(65) Prior Publication Data

US 2012/0277949 A1 Nov. 1, 2012

(51) Int. Cl.
*G01M 17/00* (2006.01)
*G06F 11/00* (2006.01)

(52) U.S. Cl.
USPC ............................................ 701/29.1; 714/25

(58) Field of Classification Search
USPC .............. 701/29.1, 29.4, 29.7, 29.9, 30, 31.6, 701/31.7, 31.9, 32.7, 32.8, 33, 34, 34.3, 34.4, 701/35; 714/25, 26, 37
See application file for complete search history.

(56) References Cited

U.S. PATENT DOCUMENTS

| | | | |
|---|---|---|---|
| 4,671,111 A | 6/1987 | Lemelson | |
| 5,631,831 A | 5/1997 | Bird et al. | |
| 5,920,848 A | 7/1999 | Schutzer et al. | |
| 5,983,200 A | 11/1999 | Slotznick | |
| 6,076,099 A | 6/2000 | Chen et al. | |
| 6,085,178 A | 7/2000 | Bigus et al. | |
| 6,192,354 B1 | 2/2001 | Bigus et al. | |
| 6,269,392 B1 | 7/2001 | Cotichini et al. | |
| 6,609,051 B2 | 8/2003 | Fiechter et al. | |
| 6,643,801 B1 | 11/2003 | Jammu et al. | |
| 6,691,007 B2 | 2/2004 | Haugse et al. | |
| 6,836,708 B2 | 12/2004 | Tripathi | |
| 6,920,412 B1 | 7/2005 | Sarkar et al. | |
| 6,950,782 B2 | 9/2005 | Qiao et al. | |
| 7,233,879 B1 | 6/2007 | Chigusa | |
| 7,254,491 B2 | 8/2007 | Mylaraswamy et al. | |
| 7,260,501 B2 | 8/2007 | Pattipatti et al. | |
| 7,519,458 B2 | 4/2009 | Buckley | |
| 7,536,277 B2 | 5/2009 | Pattipatti et al. | |

(Continued)

OTHER PUBLICATIONS

International Search Report and Written Opinion issued May 8, 2012, in PCT/US 12/22186 filed Jan. 23, 2012.

(Continued)

*Primary Examiner* — Mary Cheung
*Assistant Examiner* — Rodney Butler
(74) *Attorney, Agent, or Firm* — Oblon, Spivak, McClelland, Maier & Neustadt, L.L.P.

(57) ABSTRACT

A control unit executes a first agent of a first subsystem of a vehicle, the first agent including a fault detection agent and a communication agent. The fault detection agent monitors performance data of the first subsystem to identify a problem in the first subsystem, stores first candidate fault diagnosis processes corresponding to the first subsystem in a first memory, and searches for a fault diagnosis process which identifies a fault causing the problem in the first subsystem from among the first candidate fault diagnosis processes. The communication agent collaborates with a second agent when a search by the fault detection agent fails to find the fault diagnosis process which identifies the fault. The collaboration includes searching a second memory which stores second candidate fault diagnosis processes, sending the monitored performance data to the second agent, and exchanging search result data between the first and second agents.

20 Claims, 18 Drawing Sheets

(56) References Cited

U.S. PATENT DOCUMENTS

| | | |
|---|---|---|
| 7,729,825 B2 | 6/2010 | Chigusa |
| 2003/0137194 A1* | 7/2003 | White et al. ............. 307/10.1 |
| 2006/0136104 A1 | 6/2006 | Brozovich et al. |
| 2007/0028220 A1* | 2/2007 | Miller et al. ............... 717/124 |
| 2007/0118256 A1 | 5/2007 | Chigusa |
| 2007/0265735 A1 | 11/2007 | Chigusa |
| 2009/0006476 A1* | 1/2009 | Andreasen et al. ...... 707/104.1 |
| 2009/0254240 A1 | 10/2009 | Olsen, III et al. |
| 2010/0042287 A1 | 2/2010 | Zhang et al. |
| 2010/0063668 A1 | 3/2010 | Zhang et al. |

OTHER PUBLICATIONS

Kaoru Noumi et al., "Approaches to the Development of the In-Vehicle LAN System," Fujitsu Ten Tech. J. No. 29 (2007), pp. 18-23.

\* cited by examiner

Figure 2A

| Intelligent Agent | |
|---|---|
| Autonomous | Reactive |
| Proactive | Rational |
| Social | Unreliable Env. |

Figure 2B

| Intelligent Agent | |
|---|---|
| Data Bank | Communication |
| Function Bank | Profiler |
| Model Bank | State Machine |

Figure 3A
| Drive Location | |
|---|---|
| Altitude | 500ft |
| Road Condition | OK |
| ... | ... |
| ... | ... |
Figure 3B
| Vehicle Info | |
|---|---|
| Make | Toyota |
| Model | RAV4 |
| Engine Type | V6 |
| Drive | AWD |
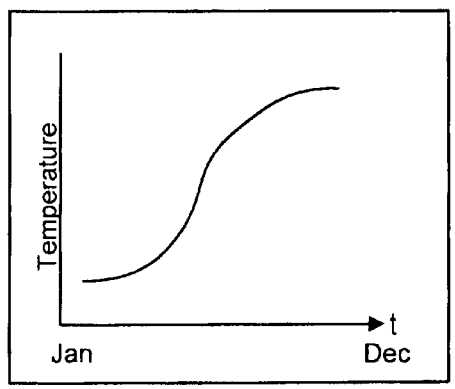
Figure 3C
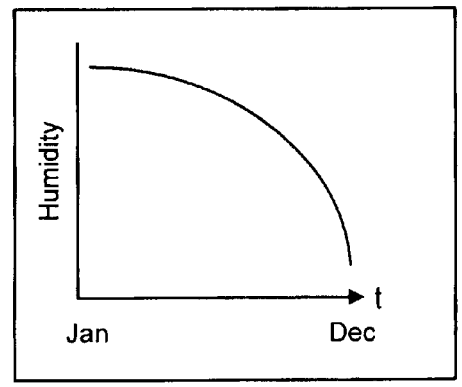
Figure 3D

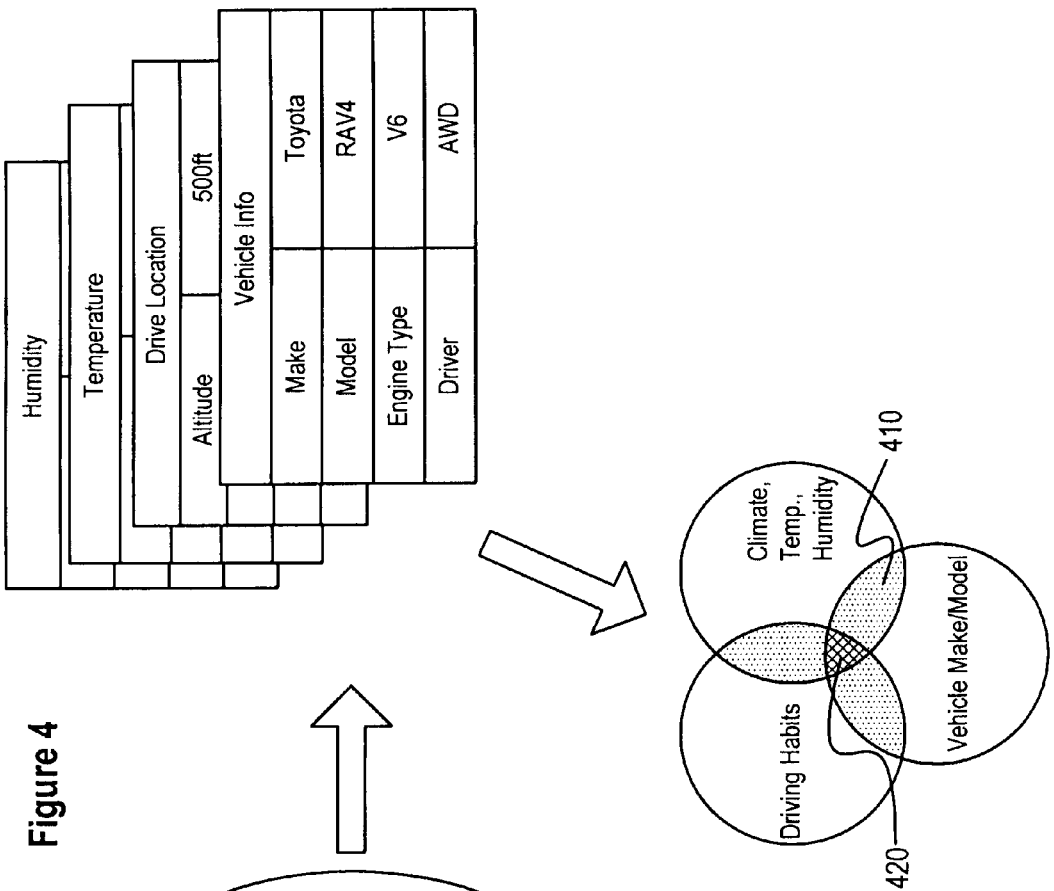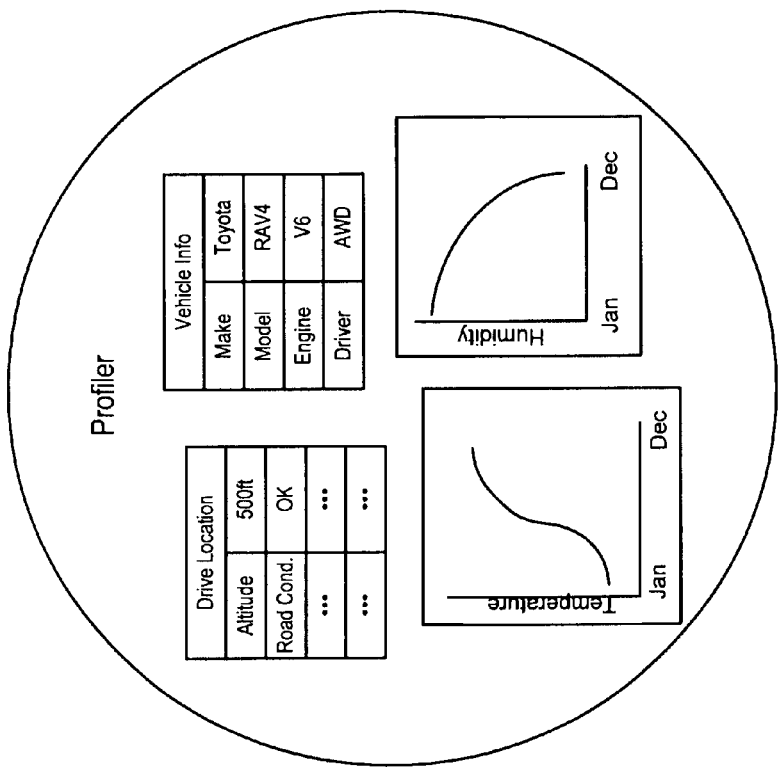
Figure 4

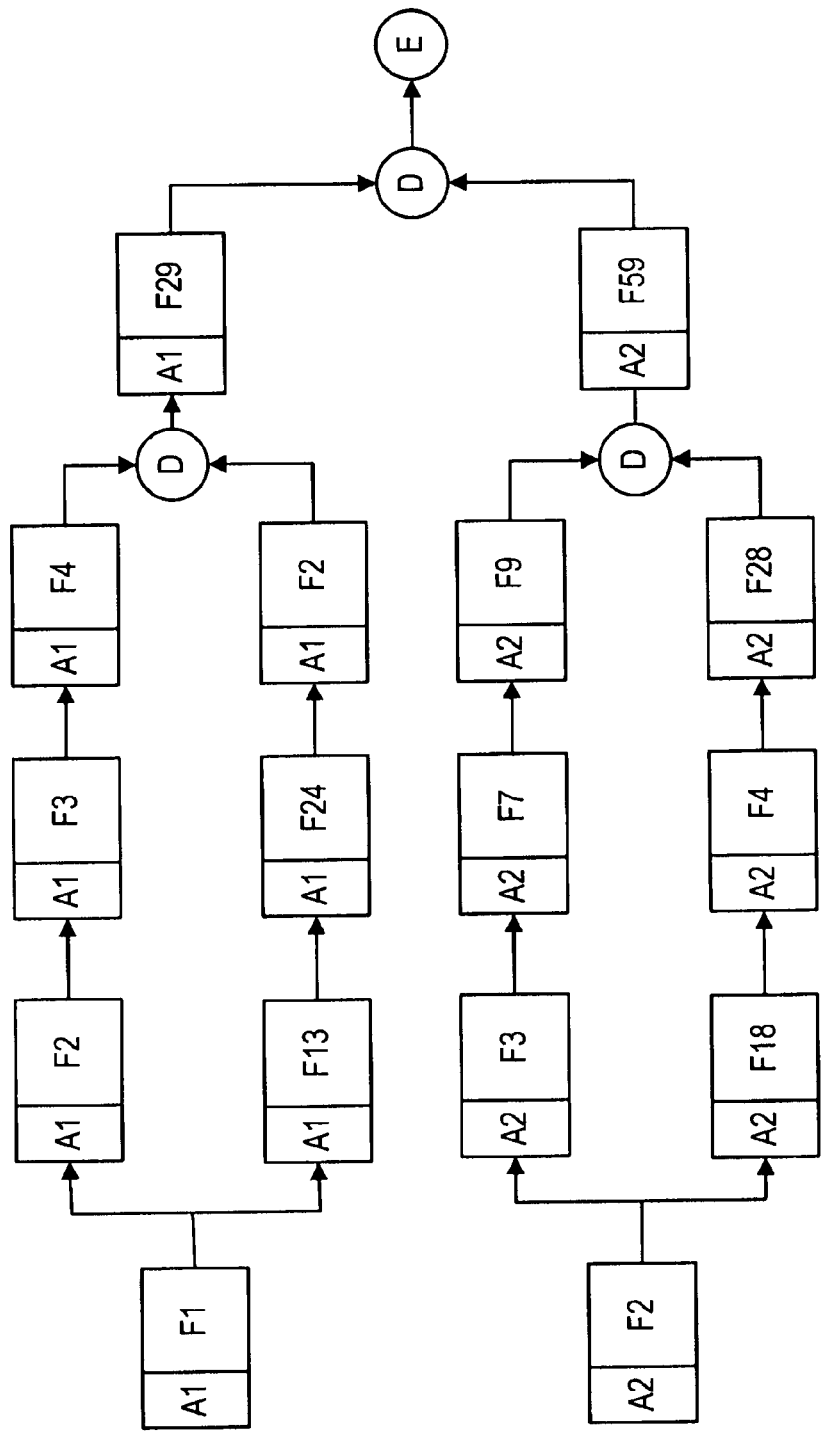

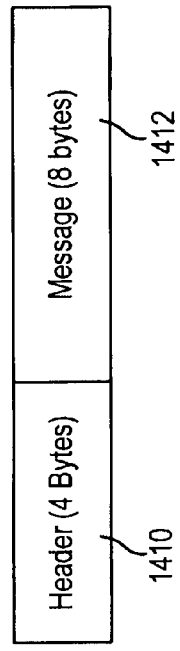
Figure 13
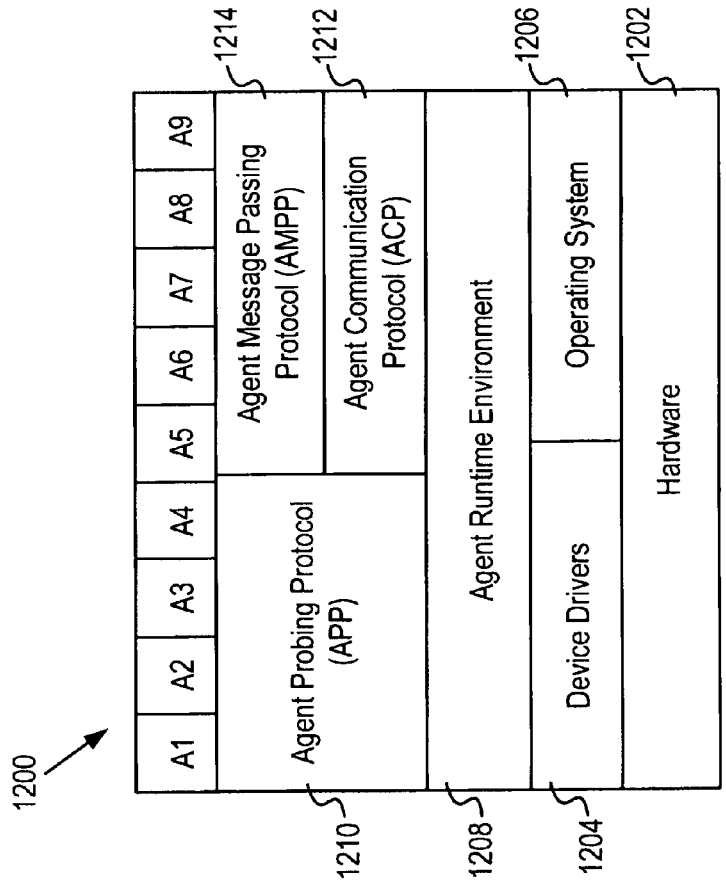
Figure 14
Figure 12

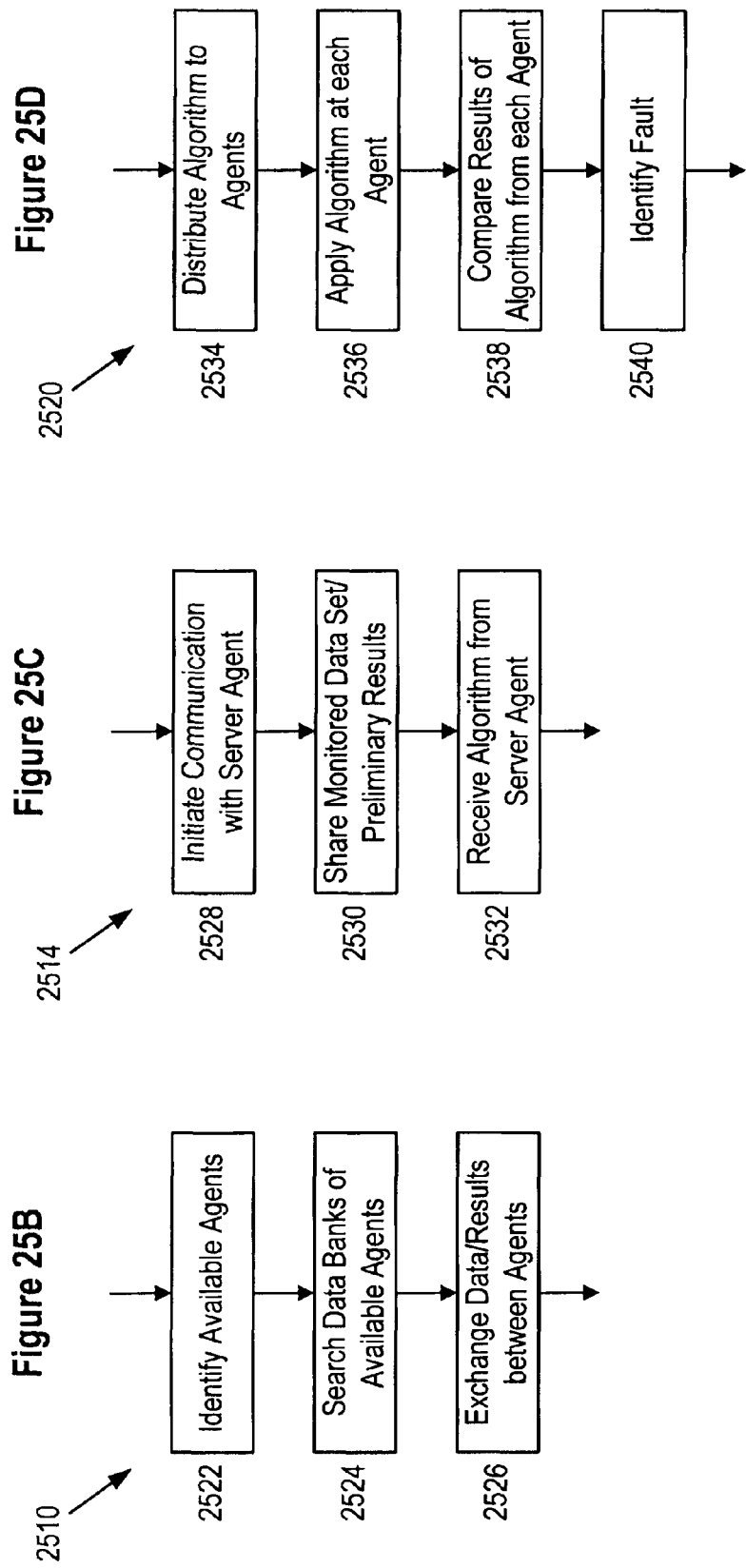

COLLABORATIVE MULTI-AGENT VEHICLE FAULT DIAGNOSTIC SYSTEM AND ASSOCIATED METHODOLOGY

BACKGROUND

The present application relates to methods, systems, algorithms and processes for diagnosing vehicle faults and, more particularly, for diagnosing vehicle faults using intelligent agents. Applications thereof include efficiently identifying and diagnosing current and potential future vehicle faults when diagnostic trouble codes (DTCs) are absent.

Onboard diagnostic (OBD) systems assist technicians diagnose and service computerized vehicle systems, such as engine and brake systems. OBD systems function to diagnose subsystem component failures and malfunctions, and function to detect subsystem component deterioration. When deterioration of a component reaches a critical level, a DTC can be generated and/or a warning light on the vehicle's dash can be illuminated to inform a driver of the error.

The level of deterioration of components of a vehicle are affected by many factors, including a driver's behavior, weather, driving conditions and mileage/time. This level of deterioration is referred to, generally, as the health of the vehicle. To ensure DTCs are inspected by a technician at timely intervals and to avoid critical failures in vehicle components, drivers are recommended to have their vehicles serviced periodically, after a fixed number of miles or after a fixed time period, for inspection and maintenance.

Typically, OBDs are performed by looking for known problems by an experienced technician. In these cases, known problems have been recorded as DTCs on the vehicle, and thus can be easily identified and repaired.

However, simply following a recommended schedule for current mileage-based and time-based inspections can be problematic. For example, period inspections do not take into consideration various factors that affect the lifetime of the vehicle components such as driver behavior, weather, driving conditions and other influential factors. Accordingly, such inspections may be too late to prevent additional harm to vehicle components, resulting in expensive repair or injury. Similarly, where vehicles are driven under optimal conditions, vehicles may be unnecessarily brought in for maintenance, resulting in unnecessary costs to the owner.

Additionally, current vehicle diagnostics generally rely on DTCs being available. When DTCs are not available, vehicle inspection and diagnosis for vehicle fault determination is lengthy and expensive.

SUMMARY

This application relates to a system and associated methodology which takes vehicle subsystem performance and vehicle driving conditions into consideration in scheduling maintenance to identify potential vehicle faults when DTCs are not available. Thus, the cause of vehicle faults can be identified quickly while avoiding unnecessary maintenance.

An exemplary control unit includes a processor configured to execute a first agent of a first subsystem of a vehicle. The first agent includes a fault detection agent and a communication agent. The fault detection agent is configured to monitor performance data of the first subsystem to identify a problem in the first subsystem, to store first candidate fault diagnosis processes corresponding to the first subsystem in a first memory, and to search for a fault diagnosis process which identifies a fault causing the problem in the first subsystem from among the first candidate fault diagnosis processes. The communication agent is configured to collaborate with a second agent when a search by the fault detection agent fails to find the fault diagnosis process which identifies the fault. The collaboration with the second agent includes searching a second memory which stores second candidate fault diagnosis processes, sending the monitored performance data to the second agent, and exchanging search result data between the first and second agents.

The control unit may include a network interface controller configured to establish a communication link between the first agent and a server agent when the collaboration with the second agent fails to result in finding the fault diagnosis process which identifies the fault. Here, the communication agent is configured to receive a server candidate fault diagnosis process from the server agent. In an exemplary aspect, the server agent is executed by a server operated remotely from the control unit.

In one aspect, the communication agent is configured to distribute the server candidate fault diagnosis process to the fault detection agent of the first agent and the second agent. The communication agent may receive a result of the second agent applying the server candidate fault diagnosis process, and the fault detection agent may compare a result of the fault detection agent applying the server candidate fault diagnosis process to the result of the second agent applying the server candidate fault diagnosis process to identify the fault. In some aspects, an event log of the identification of the fault is stored in the first memory.

In another aspect, the network interface controller is configured to establish a communication link between the first agent, the second agent and the server agent by a network, and the communication agent is configured to receive the server candidate fault diagnosis process from the server agent in response to: (1) the server agent connecting to the network, and (2) the communication agent, in response to the server agent connecting to the network, transmitting the monitored performance data and the search result data exchanged between the first and second agents to the server agent. Here, the communication agent may be further configured to transmit statistical and probability models of the monitored performance data to the server agent.

In yet another aspect, the second agent corresponds to a second subsystem of the vehicle, and the second agent is configured to monitor performance data of the second subsystem. In this aspect, the first agent is configured to identify a correlation between the monitored performance data of the first and second subsystems, and the first agent searches the second memory for the fault diagnosis process which identifies the fault based on the correlation. In an alternative aspect, the control unit includes a memory module including the first and second memories as discrete memory banks, wherein the processor is further configured to execute the second agent. In another alternative aspect, the control unit includes a network interface controller configured to communicatively link the first agent with the second agent, wherein the second agent is executed by a processor of another control unit.

The first agent may include a clustering agent configured to generate a statistical model and a probability model from the monitored performance data to predict a probability of a future problem. The fault detection agent is configured to compare the monitored performance data of the first subsystem with data from the statistical and probability models of the clustering agent to identify the problem in the first subsystem.

The search result data may include a result of applying at least a portion of a candidate fault diagnosis process to at least a portion of the monitored performance data. The candidate fault diagnosis process includes at least one of (1) reading a selected portion of the monitored subsystem performance data, (2) comparing the monitored subsystem performance data to thresholds, (3) checking a timing requirement of the monitored subsystem performance data, and (4) reporting or logging the monitored subsystem performance data. The first agent may further include a learning agent trained on healthy performance data and configured to identify the problem by comparing the monitored performance data to the healthy performance data.

BRIEF DESCRIPTION OF THE DRAWINGS

A more complete understanding of the disclosure may be attained by reference to the drawings, in which:

FIG. 2A is a table of characteristics of an intelligent agent;

FIG. 2B is a table of an anatomy of an intelligent agent;

FIG. 3A is a table showing geographic drive location information;

FIG. 3B is a table showing vehicle information;

FIG. 3C is a graph of temperature with respect to time;

FIG. 3D is a graph of humidity with respect to time;

FIG. 4 is an illustration of a Profiler generating models from given data sets;

FIG. 11 is a flowchart illustrating parallel execution of a function block algorithm by two agents;

FIG. 12 is an illustration of an Agent Software Framework;

FIG. 13 is an illustration of an Agent Communication Protocol;

FIG. 14 is an illustration of an example Message Frame;

FIGS. 25A-25D illustrate a fault detection algorithm utilizing multiple collaborating intelligent agents.

DETAILED DESCRIPTION

Figure 1:
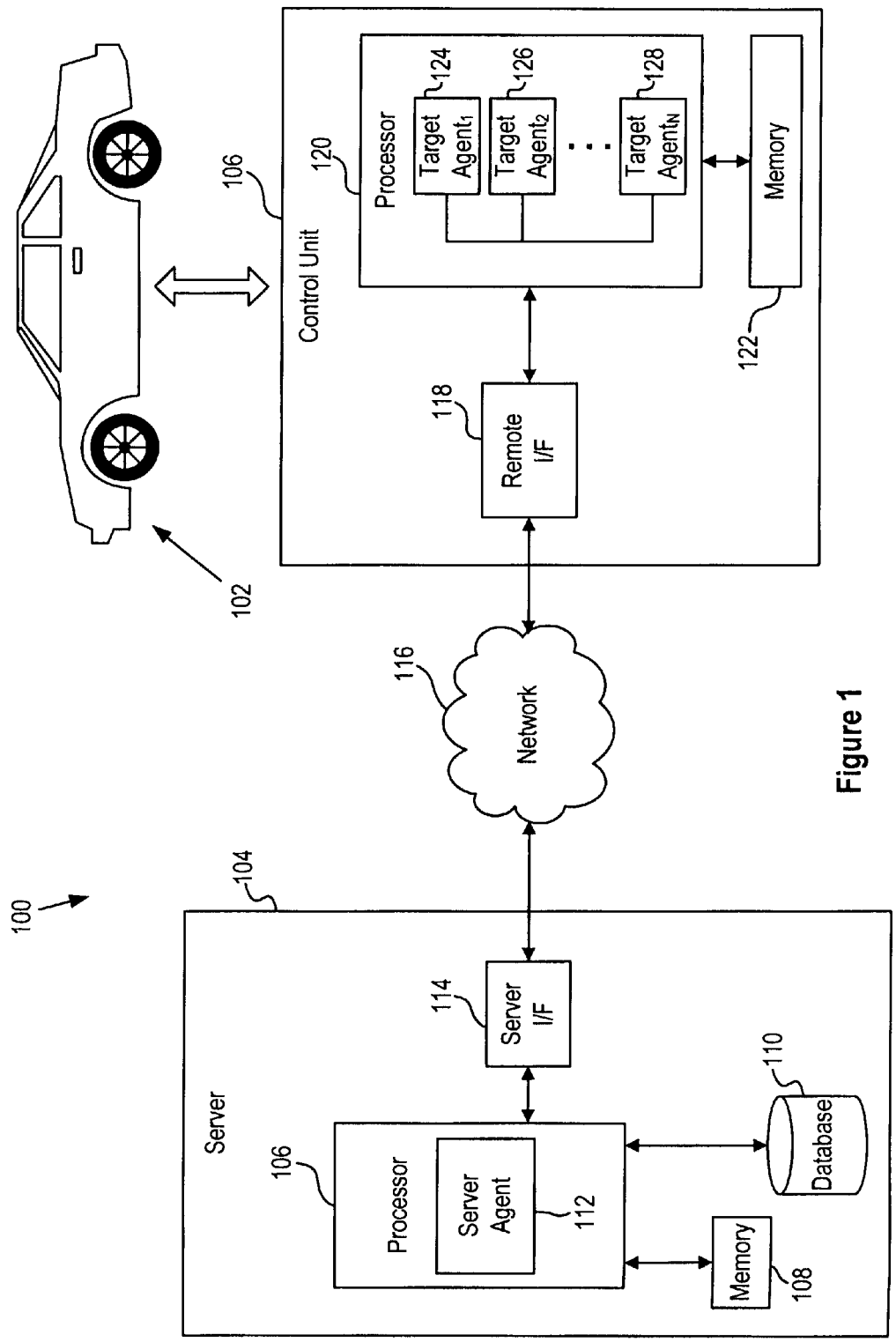
FIG. 1 is a block diagram of an exemplary architecture of a multi-agent diagnostic system.

A vehicle includes various computerized subsystems controlled by electronic control units (ECUs). An ECU may operate in or with an OBD system to monitor performance of a subsystem in order to detect a vehicle condition, such as a malfunction or other abnormal operating condition. As a servicing feature, the vehicle includes an interface to connect to a service terminal to read data from the OBD system to identify faults and recommend services to be performed.

The data read from the OBD system includes DTCs to identify a fault, which combined with visual inspection from a technician, embodies a conventional diagnostic practice. This application is directed to a multi-agent system which works under an assumption DTCs are not available.

In some aspects, the system logs into vehicle-wide data (i.e., data concerning more than one vehicle subsystem) in order to establish cross/inter-subsystem signal correlations, does a fast preliminary analysis on-board by performing novelty detection, clustering and machine learning algorithms implemented as in-vehicle agents to determine a possible fault location and severity. A more complex analysis may be requested by a data center (a server at a service terminal at a dealership) when on-board analysis in inconclusive.

Furthermore, with such a system which works under the assumption DTCs are not available, it is possible to preemptively identify possible future faults. Therefore, drivers can be warned and better prepared, and dealers/service centers can cut down on lead time to get vehicles repaired quicker. Conventional diagnostic practice is a "fix-after" or reactive approach, where service is performed after a subsystem shows signs of failure or a customer complains of performance.

Aspects of this application are directed to a "fix-before" or predictive approach. That is, this application describes aspects of monitoring vehicle-wide signals and establishing cross-correlations not only with each other but also with various historical information, e.g., patterns of vehicle usage (i.e., driving style, environment conditions), so that a collaboration between agents of various subsystems is performed to identify a vehicle fault, which may include predicting a vehicle fault.

Any processes, descriptions or blocks in flow charts should be understood as representing modules, segments, portions of code which include one or more executable instructions for implementing specific logical functions or steps in the processes/algorithms, and alternate implementations are included within the scope of the exemplary embodiments in which functions may be executed out of order from that shown or discussed, including substantially concurrently or in reverse order, depending upon the functionality involved, as would be understood by those skilled in the art.

Moreover, as will be recognized by a person skilled in the art with access to the teachings of this disclosure, several combinations and modifications of the presented embodiments can be envisaged without leaving the scope of this disclosure as encompassed by the appended claims. Thus, numerous modifications and variations of the claims are possible in light of the above teachings, and it is therefore to be understood that within the scope of the appended claims, embodiments may be practiced otherwise than as specifically described herein.

Referring now to the drawings, wherein like reference numerals designate identical or corresponding parts/steps throughout the several views, FIG. 1 depicts an exemplary architecture of a system 100 for diagnosing a fault in a vehicle 102 utilizing intelligent agents of a server 104 and a control unit 106. System 100 includes intelligent agents as a Server Agent 104 and a Target Agent 106.

The server 104 includes a processor 106, such as a Xeon microprocessor produced by Intel Corporation, connected to a memory 108 and a database 110 to execute an intelligent agent, Server Agent 112. The server 104 may be embodied as a personal computer and is provided with a server Interface 114, such as a network controller, to establish communications with the control unit 106 via a network 116. The network 116 can include a local area network (LAN) or a vehicle local area network (commonly referred to as a VLAN). The LAN may be an Ethernet-based network, and the VLAN may be based on a LIN (Local Interconnect Network). In one aspect, the network 116 is configured to use a network layer of popular automotive communication protocols such as CAN, TCP/IP, Flexray and MOST.

The network 116 may also include a LAN or VLAN connected to the Internet, in which case the server 104 and control unit 106 perform communication tasks wirelessly by radio transmitters. Exemplary radio transmitters include mobile telephone-based transmitters such as those based on GSM, CDMA and LTE standards.

The control unit 106 is a control unit of the vehicle 102, and is communicatively linked to a VLAN of the vehicle 102 to a plurality of other control units of the vehicle 102. In some aspects, the control unit 106 is or is a component of an ECU disposed in the vehicle 112. The ECU is a computer disposed in the vehicle, and the control unit 106 includes a remote interface 118 to communicate via the network 116, and a processor 120 coupled to an associated memory 122 to execute an intelligent agent, a Target Agent. In some aspects, the processor 120 executes a plurality of Target Agents 124, 126 and 128, as shown in FIG. 1. In other aspects, not shown in FIG. 1, Target Agents 124, 126 and 128 are each operated by discrete, separate ECUs of the vehicle 102.

Compared to the Target Agent 124 (and 126 or 128), the Server Agent 112 has fewer limitations with respect to accessible resources such as memory and processing power. Target Agent 124 receive real-time data streams from one or more subsystems of vehicle 102 and usually has limited processing power and memory compared to the Server Agent 112. Thus, in some aspects, the Target Agent 124 only performs compact algorithms with efficient coding and stores only a limited number of data banks and function banks in the memory 122.

In other aspects, the Target Agent 124 executes moderately sophisticated algorithms in real-time, further details of which are discussed below. Each of Target Agents 124, 126 and 128 is constructed and deployed for a specific task such as to diagnose brake issues and is communicatively linked via, in an exemplary embodiment, a VLAN with other Target Agents disposed in the vehicle 102 to collaboratively diagnose vehicle faults.

FIG. 2A shows the attributes of an intelligent agent, such as the Target Agent 124. The intelligent agent is autonomous, reactive, proactive in taking certain actions for early detection of faults, and social with other intelligent agents. The intelligent agent is a rational entity capable of making rational decisions in both reliable and unreliable environments.

FIG. 2B shows an exemplary structure of an intelligent agent as including a data bank, a function bank, a model bank, a communication channel, a profiler and a state machine. The data bank is a collection of data structures stored in, for example, a database or memory. The data structures are divided into small sets of related data, or data sets, which are related to each other using relation tags and are linked together with large amounts of data.

The data sets may include, e.g., vehicle, climate, weather, and driving habit information. Some data sets, such as, e.g., vehicle information and primary geographical location, are static, while other data sets, such as temperature, humidity, and road condition, are dynamic, i.e., changing with respect to time.

FIGS. 3A and 3B show exemplary data stored in tables. As shown in FIG. 3A, the drive location of a vehicle is generally static or changes infrequently, with an altitude of the drive location being set to 500 feet and a road condition identified as 'OK,' which is a relative measurement. This information can also be stored dynamically, for example with respect to time. On the other hand, as shown in FIG. 3B, vehicle information such as model/make is static. That is, make, model, engine type and drive of the vehicle is constant and does not change.

FIGS. 3C and 3D show exemplary dynamic data in graphs, charted with respect to time. FIG. 3C is a histogram of temperature with respect to time and FIG. 3D is a histogram of humidity with respect to time. As noted above, the information listed in the table shown in FIG. 3A may be similarly charted when the information is dynamic.

In an exemplary vehicle brake system, a Target Agent collects different sets, or categories, of data regarding the brake system. For example, the Target Agent collects a first data set including data relating to vehicle—e.g., make, model, drive train type and brake type—and a second data set of driving habit data collected over time as a driver operates vehicle. The Target Agent also collects a third data set of climate information such as weather, temperature and humidity and a fourth data set of road condition data collected, e.g., via the suspension system of vehicle. These data streams/element can be collected through communicating with a variety of intelligent agents other than the Target Agent.

The function bank of intelligent agent includes function blocks or units, each of which is designed to perform a specific part of a multi-part task (algorithm or process). Function blocks are re-entrant functions. That is, they are used in any combination and without dependence on each other. In an exemplary embodiment, the function blocks enable data collection, data manipulation, and data understanding by application of various algorithms, and perform functions of converting, comparing (e.g., to a threshold), normalizing and logging. The function blocks further have unique IDs and are specified by an Agent Runtime Environment.

The profiler of the intelligent agent is an engine that executes to generate a fault diagnostic model using function blocks from the function bank and data sets of the data bank of the intelligent agent. The profiler is generally a component of the Server Agent 112. The profiler takes into account data sets relating to, e.g., driving behaviors, road conditions and climate.

In the example depicted in FIG. 4, the profiler develops new fault diagnostic models based on the static and dynamic data sets depicted in FIGS. 3A-3D and further takes into account a vehicle's history with respect to certain types of faults, which is also stored in data bank of the intelligent agent. The profiler correlates the models, as shown by example in FIG. 4, into areas of possible problems 410 and actual problems 420.

For example, the profiler first executes various algorithms using the data set relating to vehicle make/model to detect whether the particular make/model of the vehicle has a history of brake problems. If the profiler determines that the make/model of the vehicle has a history of brake problems, then the profiler adds that information to the make/model as a known issue.

The profiler then combines data sets relating to make/model information and data sets relating to driving habit information, and executes algorithms to determine the potential effect of a driver's driving habits on the brake system for the make/model of the vehicle. If the profiler determines a potential effect exists, then the profiler adds the potential effect to the make/model of the vehicle as a known issue.

Taking the above-discussed brake system as an example, brake systems have mechanical parts that react and perform differently in different climates. In particular, erosion of brake pads may occur more quickly in a hot climate as compared to a cold climate. Thus, the profiler also evaluates the effect of climatic characteristics such as humidity, temperature and several other environmental factors by developing models based on make/model-, driving-habit-, and climate-related data sets, and running algorithms to determine correlation factors.

If the profiler determines an effect exists, then the profiler stores the appropriate information in the model bank of the intelligent agent as a known issue. Finally, the profiler executes various algorithms using all of the available data to detect possible vehicle faults and stores the results in the model bank as a fault diagnostic model for an intelligent agent of the brake system. In one aspect, the above-discussed example portrays the Server Agent 112 as the intelligent agent which performs the profiling and the Target Agent 124 as the intelligent agent for the brake system which monitors performance data of the brake system.

As discussed above, the profiler builds fault diagnostic models according to the data sets and function blocks available to each Target Agent. Thus, for example, a Target Agent has an associated fault diagnostic model, which is also known as a known issue or set of beliefs that Target Agent has about the vehicle. The exemplary brake system's Target Agent, for example, has an associated fault diagnostic model which is specially developed to inspect and detect potential brake system problems, and thus includes all information necessary for detecting faulty brakes.

The communication channel provides a well-defined network protocol for communication between intelligent agents. A standard communication protocol is developed to improve communication efficiency, which is discussed below with respect to an exemplary Agent Software Framework.

The state machine is a behavior model (an algorithm) composed of a finite number of states and transitions between those states and actions (similar to a flow graph in which one can inspect how logic proceeds when certain conditions are met). The state machine, in one aspect, is a collection of if-then-else statements that responds to events, particularly synchronous and asynchronous events, and determines an appropriate algorithm to execute and an appropriate time for its execution to obtain the best possible solution. The state machine is not aware of the types of diagnostics performed by a Server Agent or a Target Agent, which facilitates the development and deployment of the various intelligent agents.

In one aspect, the state machine is either a Server State Machine or a Target State Machine. The Server State Machine sequences appropriate function blocks to create function block algorithms, and accesses a large amount of historical data to develop a correlation table describing the relative influence of the subsystems of the vehicle on each other in terms of vehicle faults.

A multi-agent system executes general algorithms which execute selected Target Agents in a sequential, parallel or mixed order to realize a desired multi-step diagnostic process. However, due to the relatively limited memory and processing power of the Target Agents, the Target agents must decompose the problem into more manageable chunks, or sub-problems, so that it can be solved through agent cooperation.

Figure 5:
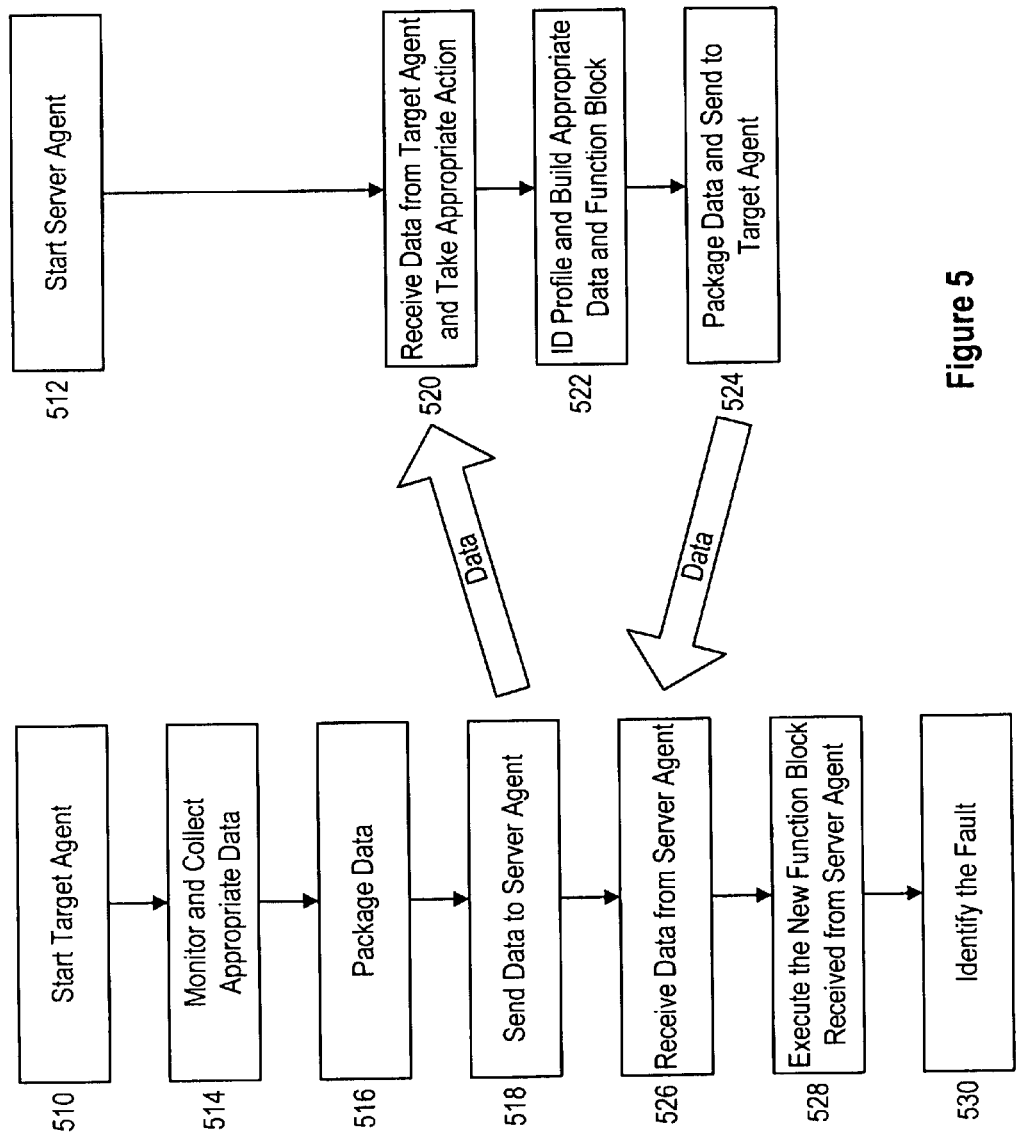
FIG. 5 is a flowchart illustrating algorithmic processes performed by a target agent and a server agent.

FIG. 5 illustrates an exemplary algorithmic interaction between a Target Agent and a Server Agent. At steps 510 and 512, execution of the Target Agent and the Server Agent is started. At step 514, the Target Agent monitors and collects appropriate data from the subsystems of the vehicle for temporary storage on-board. At step 516, the Target Agent processes and packages the data into a compacted data set by applying lossless compression techniques. The Target Agent then sends the compacted data to the Server Agent.

The Server Agent receives the compacted data takes appropriate action on the compacted data at step 520 by, for example, executing various algorithms such as unsupervised learning, clustering and classification. The Server Agent then performs ID profiling and builds appropriate data and function blocks for the Target Agent at step 522. This data is packaged into a compact format and sent to the Target Agent at step 524.

The Target Agent receives this data from the Server Agent at step 526. At step 528, a state machine of the Target Agent executes the received function blocks to perform diagnostics to, at Step 530, identify the vehicle fault.

Figure 6:
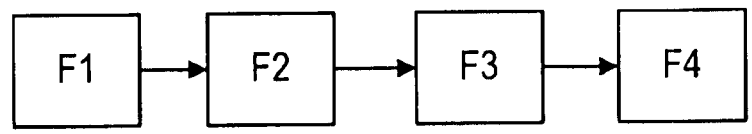
FIG. 6 is a flowchart illustrating serial execution of a function block algorithm of a fault diagnosis model.

Function block algorithms include serial, parallel, or mixed execution of function blocks depending on the current situation and need. FIG. 6 illustrates a serial execution algorithm in which function block F1 reads a signal, F2 compares the signal read in F1 to a threshold value, F3 checks timing requirements and F4 reports and logs the results. Various embodiments of other processes are shown in FIGS. 7-11.

Figure 7:
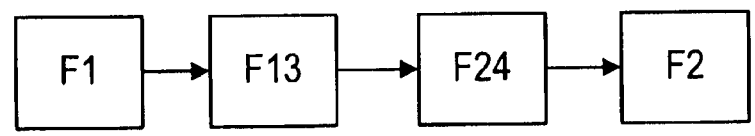
FIG. 7 is a flowchart illustrating a function block algorithm executed in an order determined by a state machine.

In FIG. 7, the state machine has randomized the order of execution of the function blocks or order the functional blocks to achieve an optimal solution. Here, F1 reads a signal, F13 reads another signal, F24 compares the results of F1 and F13, and F2 compares the effect of F1 on F13.

Figure 8:
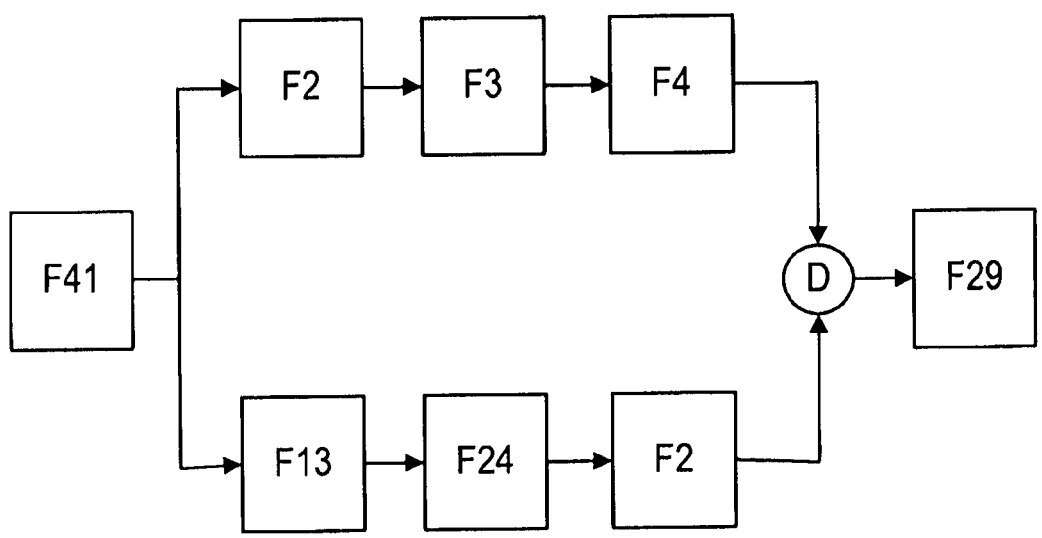
FIG. 8 is a flowchart illustrating a parallel execution of a function block algorithm.

FIG. 8 illustrates parallel execution of a function block algorithm. Thus, the results of both series of function blocks—i.e., the F2/F3/F4 series and the F13/F24/F2 series—are evaluated and the best possible solution is determined (at D) and used. The state machine generates a parallel execution algorithm when the state machine determines that multiple algorithms are necessary to determine the vehicle fault, as indicated by D, because the result from a single algorithm is too weak. For example, errors associated with a data signal or a probability model may cause the state machine to determine a result is indeterminate.

Figure 9:
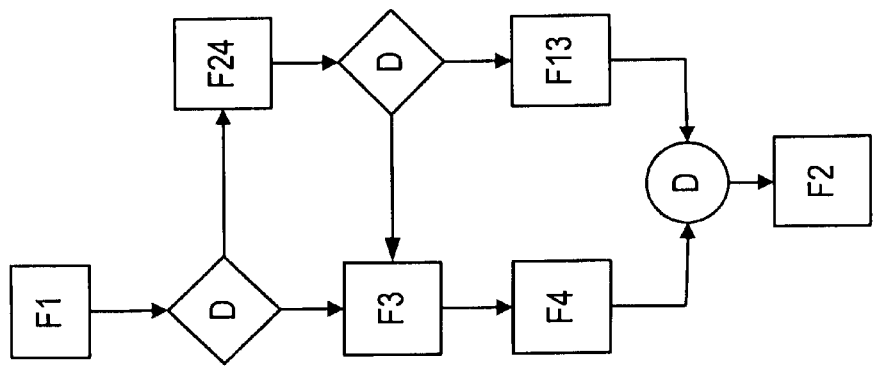
FIG. 9 is a flowchart illustrating a conditional execution of a function block algorithm.

FIG. 9 depicts an exemplary function block algorithm in which function blocks are conditionally executed and the execution path is determined based on the outcome of conditional function blocks. Conditional execution adds flexibility to the system and is used when a single predefined algorithm will not suffice. In the FIG. 9 example, function block F1 reads a signal, and an execution path—i.e., either F3 or F24— is determined based on the value of the signal—which can utilize thresholds or ranges.

Figure 10:
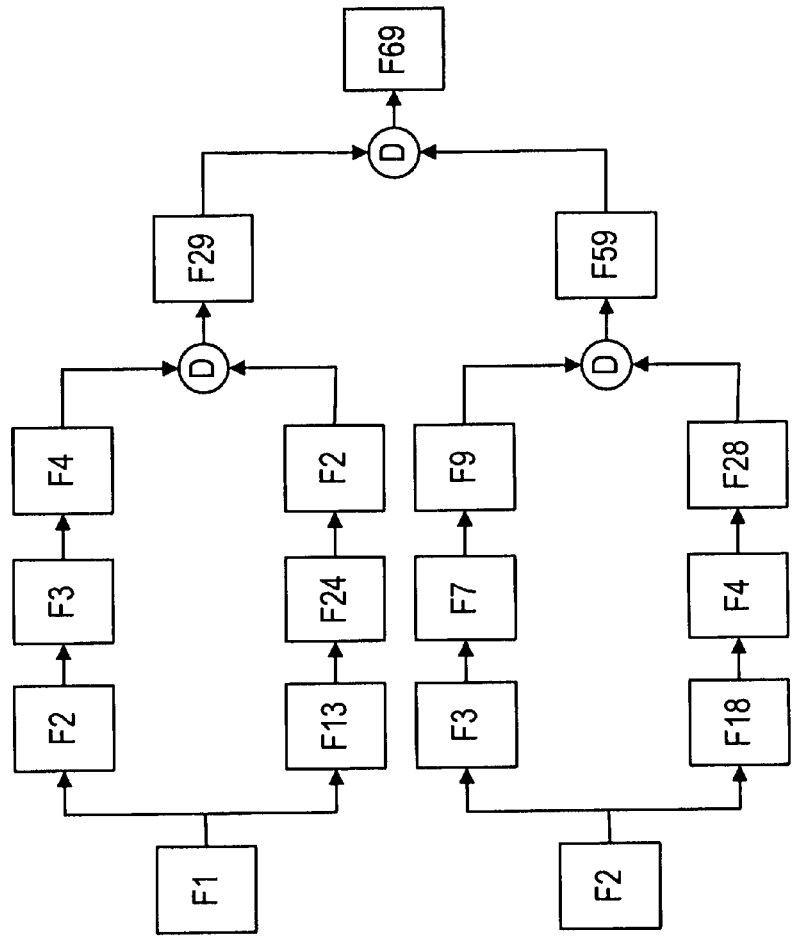
FIG. 10 is a flowchart illustrating serial and parallel execution of a function block algorithm.

The state machine may further evaluate a combination of all possible solutions to determine an optimal solution. FIG. 10 illustrates an exemplary function execution algorithm that has both serial and parallel execution. Mixed execution algorithms are used when the likelihood of detecting a fault is very low. As depicted in FIG. 10, this algorithm executes multiple nested function block algorithms in parallel, assigns a weight to the result of each nested algorithm, and determines the vehicle fault based on the gain—i.e., the product of the weight value and the result—of each nested algorithm. For example, the nested algorithm that begins with function block F1 is executed in parallel with the nested algorithm that begins with F2, and the result of each nested algorithm is assigned a weight that is multiplied by the result to determine the vehicle fault.

As previously described, the system 100 may include multiple Target Agents that share resources. For example, the Target Agent 124 can share its function blocks and collaborate with the Target Agent 126. As illustrated in FIG. 11, Target Agents A1 and A2 collaborate/work together to achieve a common goal. Target Agents A1 and A2 execute different algorithms in parallel and compare the results. Such an embodiment may utilize more than two Target Agents.

To facilitate execution of multiple intelligent agents, the system 100 supports a set of Application Programming Interfaces (APIs). As depicted in FIG. 12, the APIs make up an Agent Software Framework (ASF) 1200, which has a layered architecture. The ASF 1200 has hardware 1202, which is supported by device drivers 1204 and operating system layer 1206. The ASF 1200 also includes an Agent Runtime Environment (ARE) 1208 built on the device drivers 1204 and the operating system layer 1206. An Agent Probing Protocol (APP) 1210 and an Agent Communication Protocol (ACP) 1212 supports the ARE 1208. The ACP 1212 is supported by an Agent Message Passing Protocol (AMPP) 1214. Intelligent agents A1-A9 support APP layer 1210 and AMPP layer 1214. Additionally, vehicle subsystems capable of running the agent system described herein support the ARE 1208.

The ARE 1208 is a predefined software framework capable of remotely and securely accepting intelligent agents and providing runtime execution of the intelligent agents. The ARE 1208 registers intelligent agents in a database and provides a unique ID to each intelligent agent. The ARE 1208 further provides an agent scanning feature for other intelligent agents in the same subsystem and in the vehicle.

The APP 1210 provides functions through which a Target Agent monitors and collects data such as predefined probing functions and monitoring and logging functions. The ACP 1212 provides network-independent message passing services and is based on the feature of ARE 1208 that each intelligent agent has a unique ID (e.g., A1-A9). The ACP 1212 further provides a set of interfaces to enable communication between a Server Agent and the Target Agent, and is configured to use the network layer of popular automotive communication protocols such as CAN, TCP/IP, Flexray and MOST as depicted in FIG. 13.

The AMPP 1214 uses the ACP 1212 feature of ARE 1208 to communicate with other intelligent agents. In particular, the AMPP 1214 packs a message into a frame, which as illustrated in FIG. 14, includes a header 1410 and a message body 1412. The header 1410 stores information regarding the source and destination agents, the type of communication such as send or receive, and the length of the message. The message body 1412 stores the message to be sent or received. While FIG. 14 illustrates a message having a size of 8 bytes, message length/size may vary as needed and may further be coded by the message header.

Figure 15:
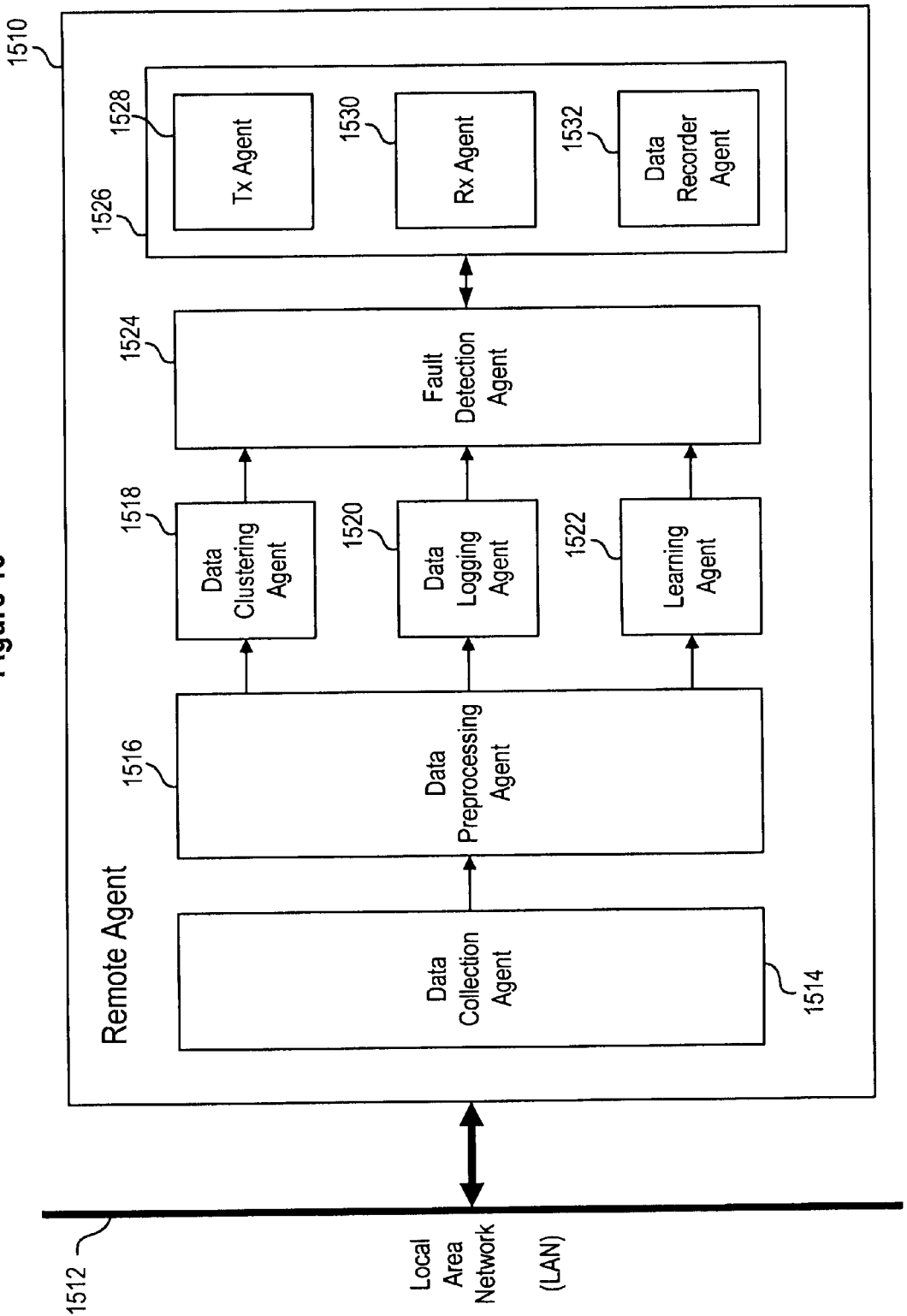
FIG. 15 is a block diagram of a remote agent connected to a local area network and including a collection of agents.

An exemplary embodiment of this disclosure includes relatively more complex and more autonomous Remote Agents that perform the vehicle diagnostics. The Remote Agents correspond to the Target Agents discussed above, but include further features. FIG. 15 depicts an exemplary Remote Agent 1510 as a collection of intelligent agents working together to identify hard-to-detect faults. The Remote Agent 1510 is a wide-coverage agent, i.e., is capable of interacting with as many vehicle subsystems as possible, which enables observation of cross-coupling among the vehicle subsystems, often critical for cause-effect analysis.

The Remote Agent 1510 is coupled to the vehicle local area network (VLAN/LAN) 1512, the main vehicle communications bus through which the intelligent agents gather data from the vehicle subsystems and through which messages are sent and received between the various vehicle modules, which include other Remote Agents (not shown in FIG. 15). However, to communicate with the vehicle modules, Remote Agent 1510 decodes and encodes messages received/transmitted via the LAN 1512.

An exemplary embodiment of Remote Agent 1510 includes Data Collection Agent (DCA) 1514, which monitors and collects data via the LAN 1512. The LAN 1512 carries three types of data: periodic data, asynchronous data, and requested, or on-demand, data. Periodic data typically represents the health and status of vehicle subsystems and is periodically broadcast via the LAN 1512, e.g., every 10/100 ms; asynchronous data is transmitted when abnormal events or faults occur in vehicle subsystems; and requested data is data requested from one vehicle subsystem by another vehicle subsystem. In the case of periodic or requested data, the DCA 1514 selects the desired data signals and implements a suitable data collection scheme, e.g., a constant sampling rate or a variable sampling rate.

The Remote Agent 1510 also includes a Data Preprocessing Agent (DPA) 1516 that immediately acts on the data collected by the DCA 1514 to remove the data header information from the message and, if the message was transmitted over multiple frames, to wait until the entire message, or data, is collected. Preprocessing by the DPA 1516 may involve simple as well as moderately complex operations such as moving average computation or wavelet decomposition and is signal specific. The processed data is then made available to other agents as "features."

The Data Clustering Agent 1518 generates statistical and probability models based on data received from the DPA 1516, and may further generate advanced clustering algorithms for categorizing the data. However, the majority of the data is likely to remain unlabeled and uncategorized until a Server Agent is connected to and provides class labeling information based on much more extensive analysis so that a probability of error is sufficiently small.

Figure 16:
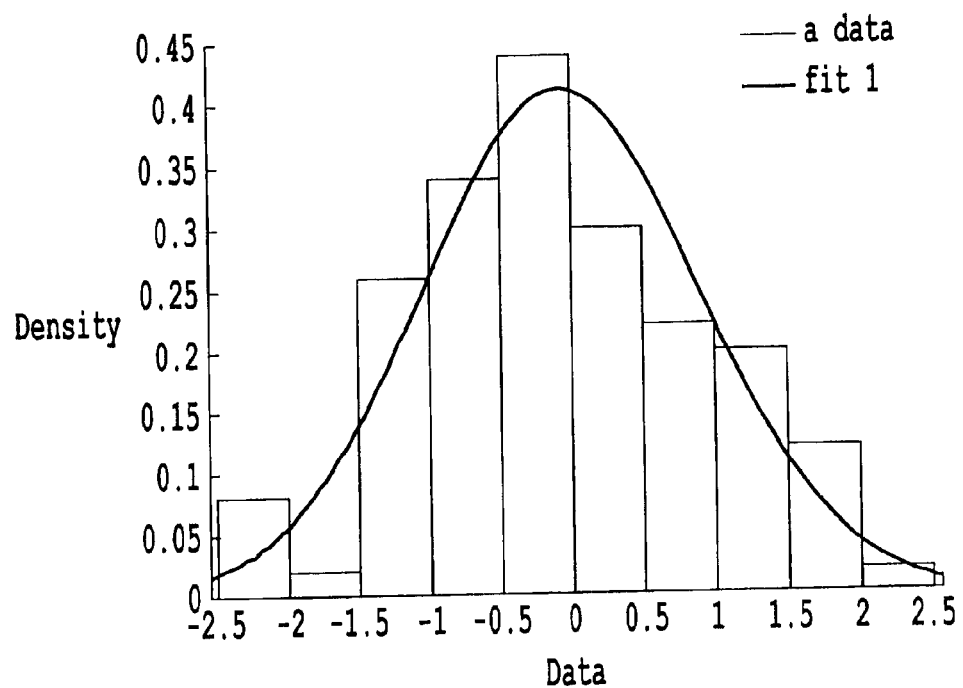
FIG. 16 is a data density histogram generated by a data clustering agent as a statistical model.
Figure 17:
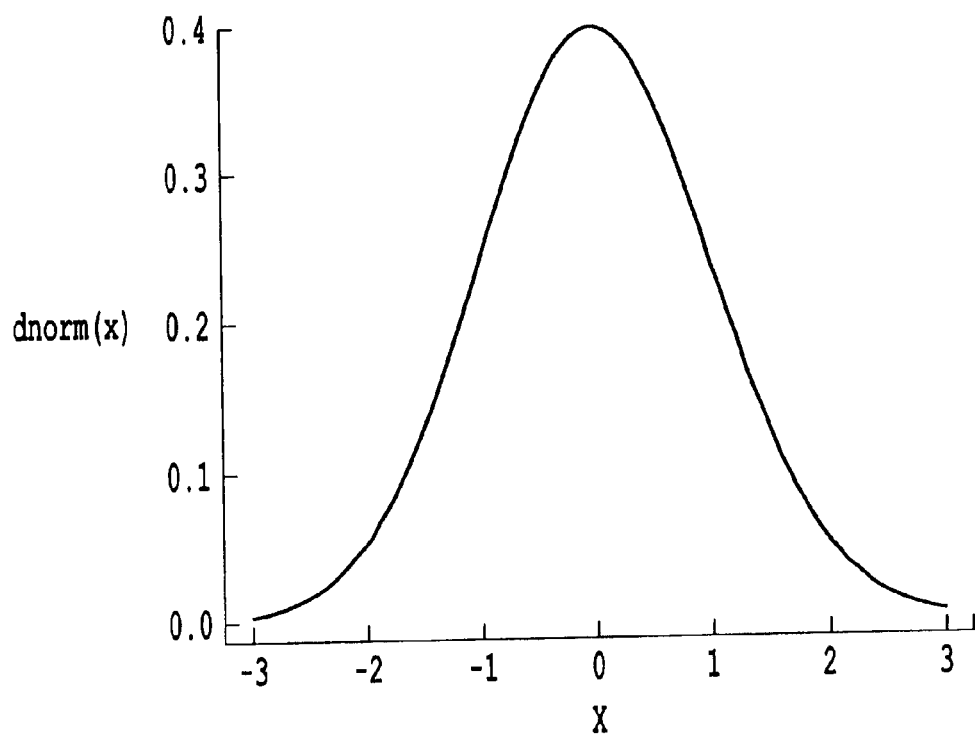
FIG. 17 is an ideal Gaussian distribution utilized by a data clustering agent as an exemplary probability model of measurement errors.

The statistical models generated by Data Clustering Agent 1518 represent snapshots of data and may include, for example, data histograms similar to the data histogram depicted in FIG. 16. Probability models generated by Data Clustering Agent 1518, on the other hand, are developed from a much larger amount of data and are used to predict the probability of faults in a statistically significant way. The Gaussian distribution depicted in FIG. 17 is an exemplary probability model and a popular assumption about measurement errors.

Adverting back to FIG. 15, the Data Logging Agent 1520 of the Remote Agent 1510 stores specific data for a certain period of time (e.g., Freeze Frame Data). In particular, Data Logging Agent 1520 selects desired signals from the DCA 1514 and logs those signal values for a given period of time, e.g., from the beginning to the end of a trip.

Figure 18:
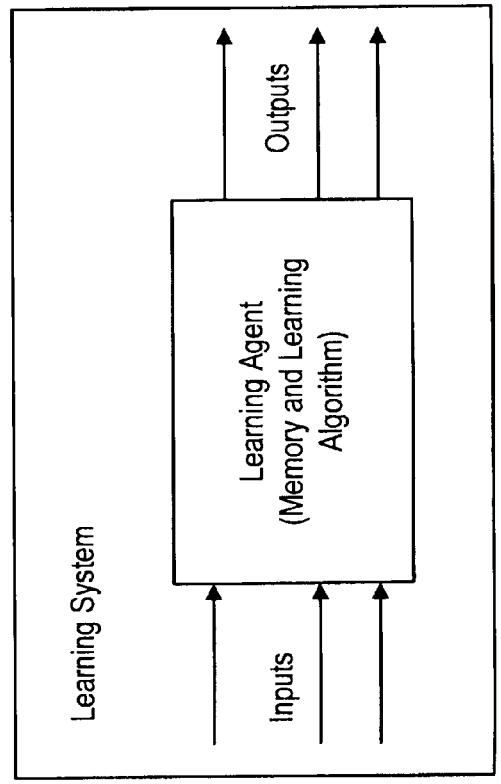
FIG. 18 is a block diagram of a Learning Agent of a Learning System.

The Learning Agent 1522 implements artificial intelligence and machine learning algorithms. An exemplary Learning Agent 1522 is depicted in FIG. 18, which illustrates mapping by Learning Agent 1522 of one set of data onto another, e.g., mapping of input variables into outputs.

Fault/Novelty Detection Agent 1524 receives data from the Data Clustering Agent 1518, the Data Logging Agent 1520 and the Learning Agent 1522 and compares processed data (in feature space) against known data to detect and classify unusual and/or abnormal behavior on-board. The processed data is, for example, received from DPA 1516 via Data Logging Agent 1520, and may also be sent to a Server Agent by the Communication Agent 1526 for additional analysis or confirmation of analysis done on-board if the problem criticality demands quick corrective action. The Communication Agent 1526 includes a Transmission Agent 1528, a Reception Agent 1530 and a Data Recorder agent 1532.

Known data (baseline data) is acquired when a new vehicle is rolled out from the dealer or factory, and the Remote Agent 1510 assumes that this initial data is fault-free, and represents signature values for the vehicle subsystems and healthy performance data. That is, the Remote Agent 1510 presumes each vehicle, as it rolls out of the factory, has unique signature sensor values from which a unique baseline is established to embody a healthy model of a vehicle's subsystems.

Figure 19:
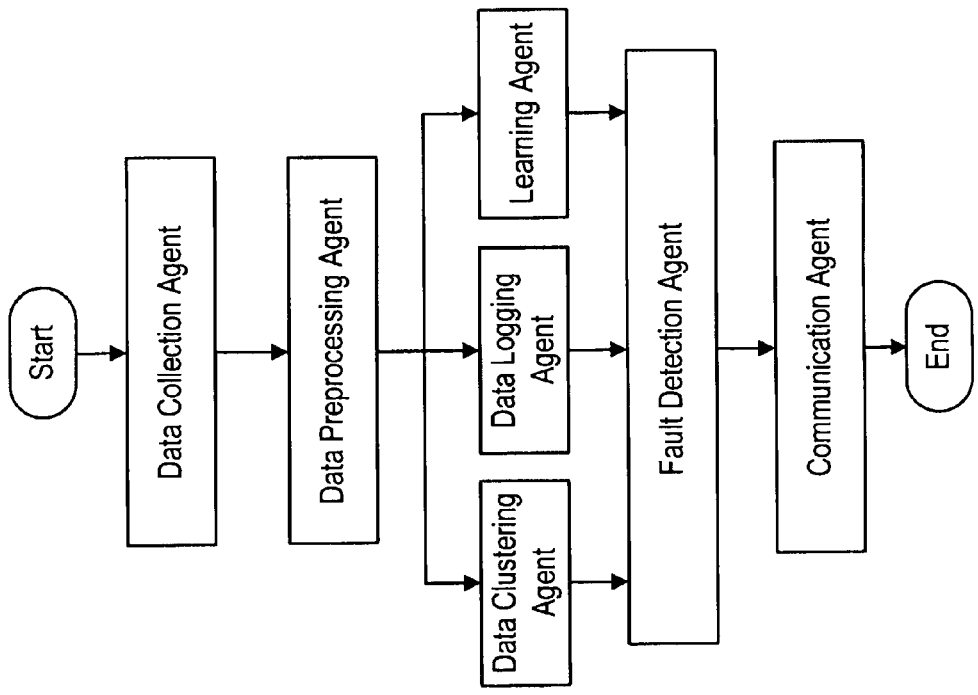
FIG. 19 is a block diagram illustrating an algorithmic interaction of the collection of agents of the remote agent shown in FIG. 15.

As discussed above, the Fault/Novelty Detection Agent 1524 uses data from the Data Clustering Agent 1518, the Data Logging Agent 1520 and the Learning Agent 1522 to detect novelties. For example, Fault/Novelty Detection Agent 1522 uses data from Data Clustering Agent 1518 to distinguish natural changes in data values due to, e.g., operating mode changes or environmental changes from those changes due to vehicle faults. An exemplary algorithmic process for the Remote Agent 1510 is shown in FIG. 19.

As noted above, in FIG. 15, the Communication Agent 1526 includes a Transmission Agent 1528, a Reception Agent 1530 and a Data Recorder agent 1532. The Communication Agent 1526 controls communication between the Remote Agent 1510, a Server Agent (such as the Server Agent 122) and other Remote Agents (not shown) connected to the LAN 1512. For example, the Transmission Agent 1528 compresses data for transmission using lossless compression algorithms, the Reception Agent 1530 receives data from and the Data Recorder Agent 1532 enables Remote Agent 1510 to store data on-board for broadcasting to the Server Agent upon establishing communication with the Server Agent (or as temporary storage when communication is interrupted).

In one exemplary communication scenario, all of the performance data of a subsystem monitored by a Remote Agent is streamed to a Server Agent via a dedicated channel. This scenario requires high bandwidth and a constant vehicle/server connection. This scenario is ideal for initialization at the factory or during a dealer visit and will be more accessible in time via, e.g., descendants of WiMax or cognitive radios.

In another exemplary communication scenario, only selected data, e.g., the most critical signals or the results of on-board processing, are sent to the Server Agent. This scenario requires much less bandwidth. This scenario implements of a selection process to select the desired high-priority data and information for sending to the Server Agent.

As discussed above, aspects of this disclosure can be embodied implemented in a vehicle brake system, which has both mechanical and electrical components. The vehicle brake system is one of the most critical safety systems and therefore is generally recommended to be inspected twice a year. Early detection of a fault in a brake system not only saves money but also prevents deadly accidents. Further aspects of this disclosure are discussed with reference to the above-discussed brake system.

Figure 20:
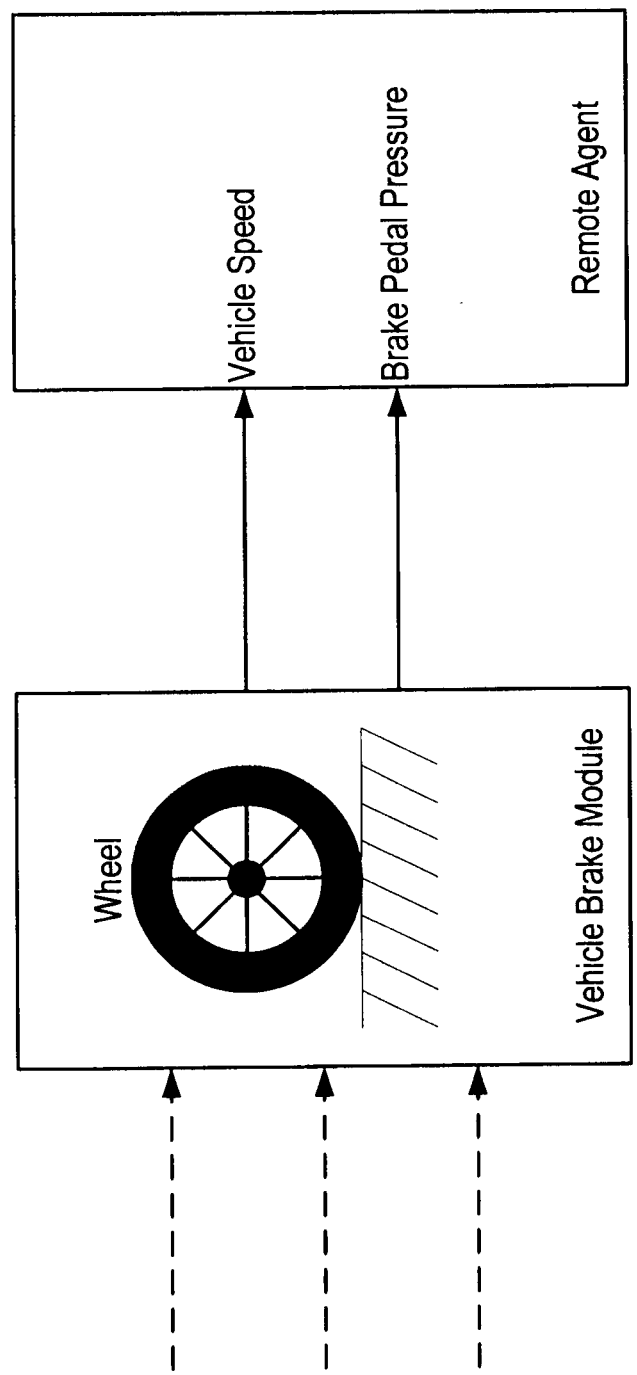
FIG. 20 is a block diagram illustrating a remote agent receiving data from a Vehicle Brake Module.

In an exemplary embodiment, as depicted in FIG. 20, the Remote Agent 1510 communicates with the vehicle brake module via the LAN 1512, where the DCA 1514 collects two signals: a brake pedal pressure and a vehicle speed, which is utilized, e.g., to determine a deceleration rate of the vehicle (a vehicle response). The DCA 1514 continuously monitors these input signals.

Figure 21:
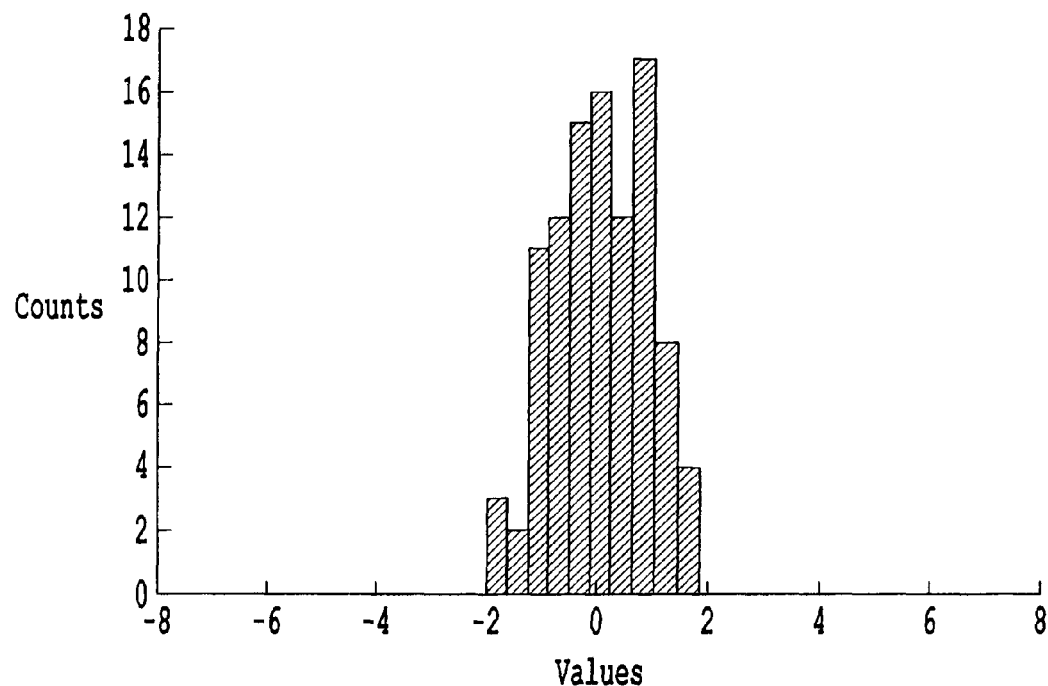
FIG. 21 is a histogram illustrating a statistical model defining a relationship between an amount of brake pedal pressure and the vehicle response for a healthy vehicle.
Figure 22:
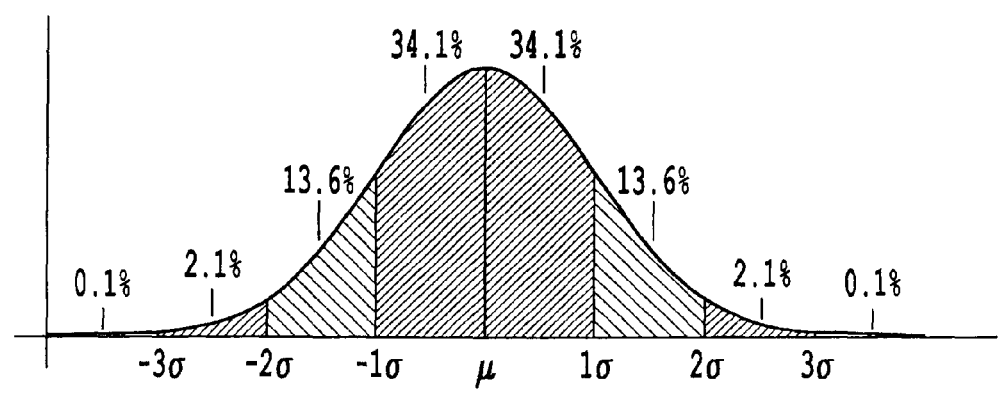
FIG. 22 is a probability model developed by a data clustering agent by accumulating many instances of statistical models, such as the histogram illustrated in FIG. 21.

The DPA 1516 preprocesses the data from the DCA 1514 into a filtered brake pedal pressure and a filtered vehicle speed by applying suitable filters to reduce the amount of noise in the signals. The Data Clustering Agent 1518 develops a statistical model, such as that shown in FIG. 21, to define a relationship between the amount of brake pedal pressure and the vehicle response for a healthy vehicle using the results of the DPA 1516. The Data Clustering Agent 1518 also develops a probability model, such as that shown in FIG. 22, by accumulating many instances of the statistical models, e.g., over many different trips.

The Data Logging Agent 1520 stores a fresh set of data for a given trip which may be determined by start/finish GPS locations. Over time, the brake system inevitably starts to degrade in performance, which is detected by the Data Clustering Agent 1518 as a statistically significant difference between the statistical model (data snapshot) and the probability model, where a statistical difference is determined by, e.g., ANalysis Of VAriance (ANOVA) or the chi-square criterion (the probability model uses much more averaging than the statistical model). If statistically significant differences persist over several data snapshots, then the Data Clustering Agent 1518 signals that a novelty (problem) is present, and a fault is suspected. The exemplary probability model depicted in FIG. 22 includes both healthy and faulty areas of subsystem performance, with "problems" areas being identified in FIG. 22 as a distance from µ increases.

The Learning Agent 1522 is also utilized to compare expected faulty brake behavior with the actual faulty brake behavior, where the Learning Agent 1522 represents a physics-based brake model at a different level of performance degradation, e.g., brake pad wear, which as discussed above can take climate factors into consideration. The Learning Agent 1522 can be developed by the Server Agent based on data from a plurality of vehicles of a common model, and then deployed to the Remote Agent 1510 to aid in clustering the data into specific brake degradation categories. Thus, the Learning Agent 1522 does not need to originate from data particular to the target vehicle, but can be transmitted to the target vehicle by the server to best match actual vehicle data to "best" predict the output of the vehicle response. This "best" prediction can utilize a root mean squared error between actual and the model data to describe a brake degradation level. A similar approach using a comparison of known models of normal and faulty behavior (known issues) may also be used to pinpoint the source of the brake problem (e.g., brake pad wear, brake shoe wear or hydraulics) to determine the root cause of the vehicle fault.

Further, high-level algorithms can be employed for diagnostics in a multi-agent setting, where each algorithmic block may itself be an agent or a sequence of agents implementing one of the processes discussed above.

Figure 23:
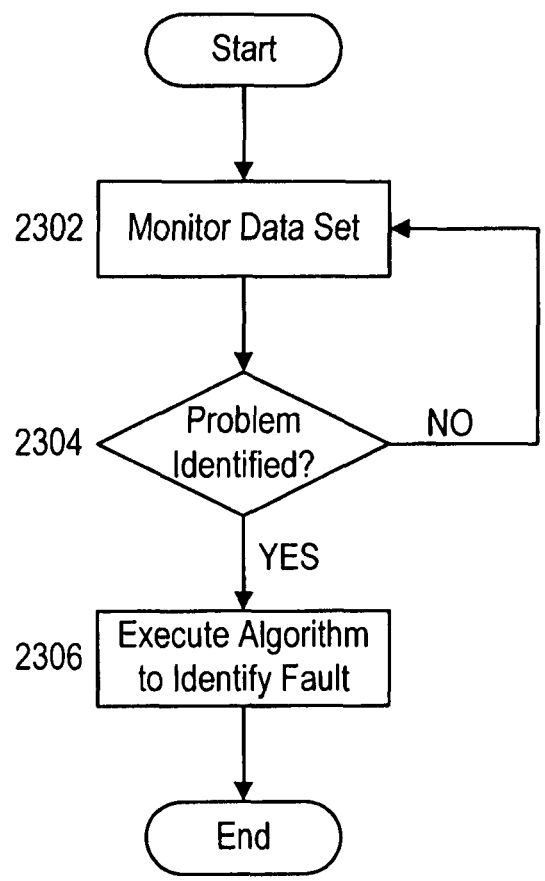
FIG. 23 is a flow chart of a diagnostic algorithm of an intelligent agent.

FIG. 23 illustrates an exemplary intelligent diagnostic algorithm that includes monitoring a data set, identifying possible problems, and taking an appropriate action. As previously mentioned, when a vehicle is initially rolled out of the factory or a dealer, the system assumes that all of the modules of the vehicle are working properly and that only after some time will the vehicle modules start to show symptoms of abnormal behaviors. Thus, at the first step 2302 of the algorithm of FIG. 23, the signals are monitored. However, because all of the possible recorded data can not be stored in the vehicle's on-board system or broadcast to a Server Agent, a clustering scheme is implemented by the DCA 1518 for monitoring the raw input and developing statistical models such as histograms to identify faults. An unsupervised Learning Agent 1522 is implemented alongside the DCA 1518 and is trained using healthy data so that, once a fault occurs, the Learning Agent 1522 can detect the fault.

Once a vehicle starts to show abnormal behavior, the Fault Detection Agent 1524 compares the input signal characteristic against the statistical model developed by the DCA 1518 to identify a problem at step 2304. The Learning Agent 1522, as discussed above, can also identify the problem at step 2304. In the above-discussed brake model, the monitored data set includes vehicle slip, the time it takes for the brakes to respond, as well as several other factors. The fault causing the problem identified at step 2304 is identified by executing an algorithm at step 2306.

Figure 24:
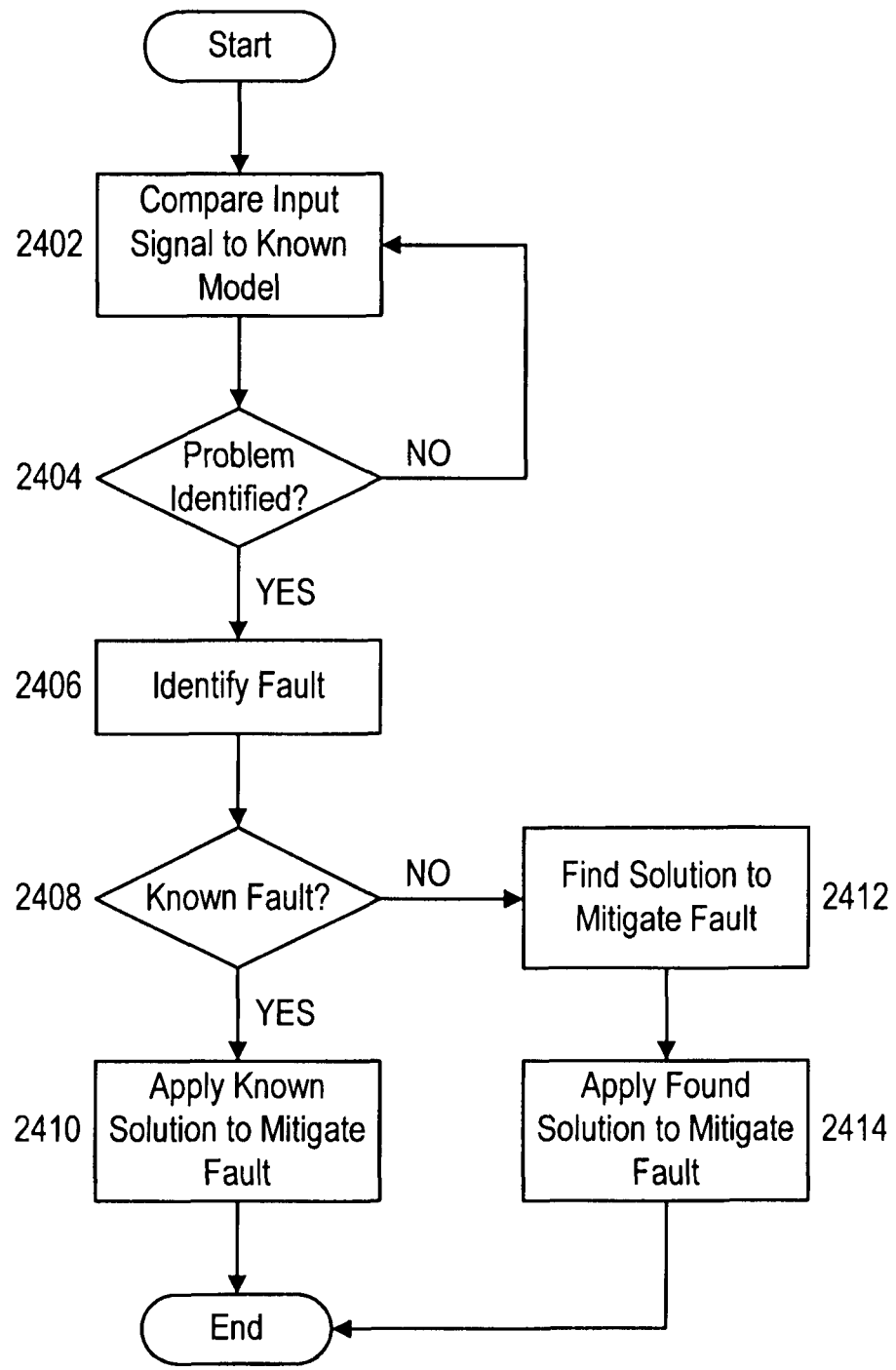
FIG. 24 is a flow chart of a fault identification and mitigation algorithm of an intelligent agent.

FIG. 24 is a flowchart that illustrates an algorithm for the detection of a fault in a vehicle where the intelligent agent system 100 further finds a solution to mitigate a fault. Steps 2402 and 2404 parallel those of FIG. 23. Once the problem is identified at step 2404, a fault is identified at step 2406, which may include executing an algorithm to identify the fault.

At step 2408, a determination is made as to whether the fault is known. When known, a known solution is generally available to mitigate fault, which is applied at step 2410. Otherwise, solution to mitigate the fault is found at step 2412. The step 2412 can include communication with a Server Agent or other intelligent agents. Once the solution is found, the solution is applied to mitigate the fault at step 2414.

Figure 25A:
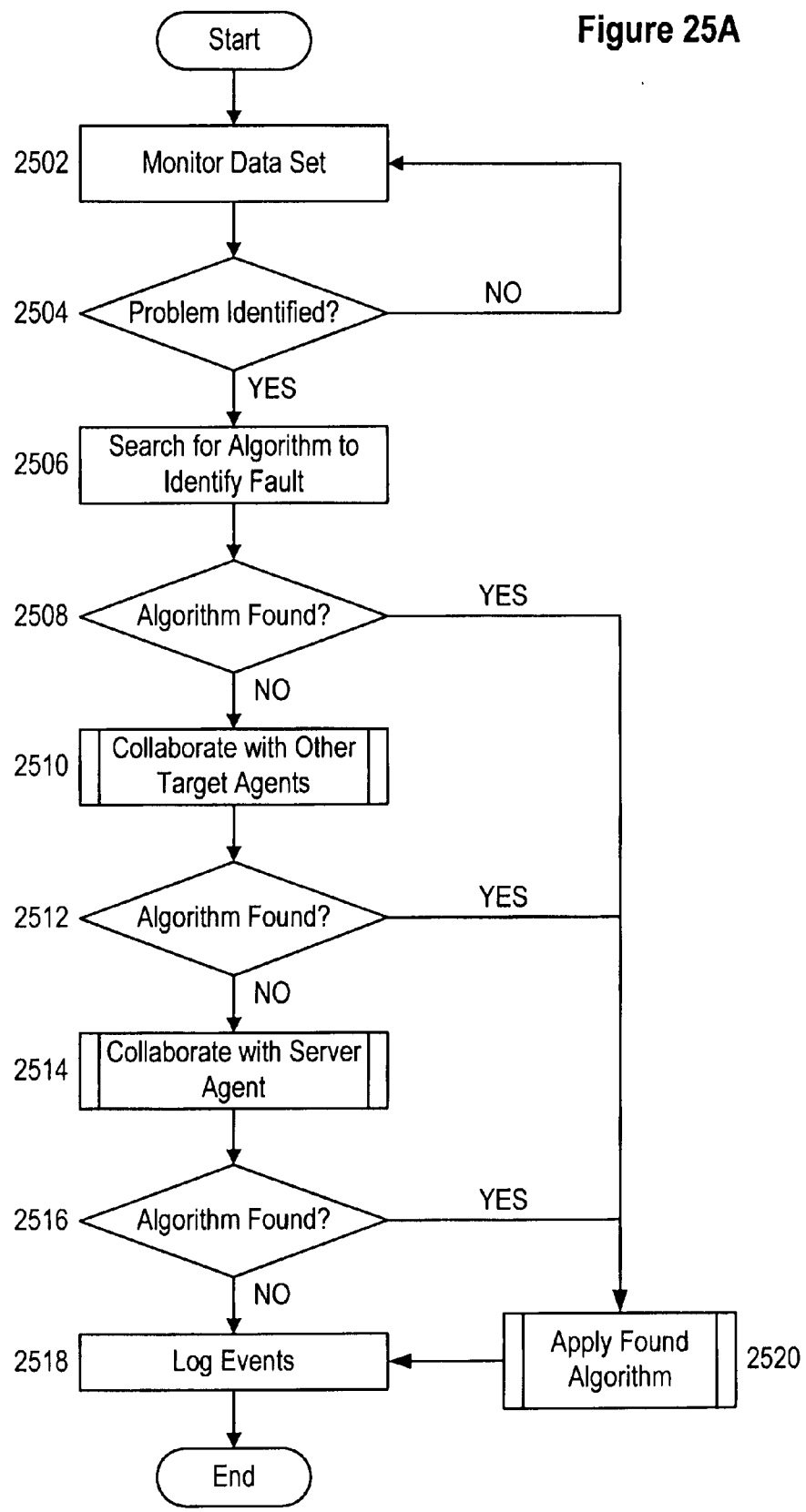

FIG. 25A is an algorithmic flowchart that illustrates a multi-agent algorithm for fault detection as being performed by a Target or Remote Agent of a vehicle. At step 2502, performance data of a subsystem (a data set) is monitored and problems at identified at step 2504. When a problem is identified at step 2504, an algorithm search is performed to identify a fault causing the problem. Here, the problem refers to a novel data set or an abnormal data set, and the fault is the mechanical/electrical issue that causes the novel data set or the abnormal data set. When an appropriate algorithm is not found, collaboration is performed with other Target (or Remote) Agents of the vehicle at step 2510.

When the collaboration with the other Target agents fails to find the algorithm which identifies the fault at step 2512, collaboration with a Server Agent is performed at step 2514. Since the Server Agent, as discussed above, has much more resources, this will generally result in an appropriate algorithm to be found. However, when the algorithm is not found, the events of the algorithm are logged at step 2518. When the algorithm is found, the same is applied at step 2520.

The collaboration at step 2510 between the Target Agents is shown in further detail in FIG. 25B. Here, a procedure is followed of identifying available agents at step 2522, searching the data banks of the available agents at step 2524 and exchanging data/results between the Target Agent and the other Target Agents at step 2526. Although shown in the order of step 2524 then step 2526, it should be appreciated that the collaboration process can repeat it part or whole, or in a different order (step 2526 prior to step 2524).

The collaboration at step 2514 between the Target Agent and the Server Agent is shown in further detail in FIG. 25C. Here, a procedure is followed of initiating communication with the Server Agent (LAN initialization) at step 2528 and sharing monitored data sets and preliminary results (failed results/results of failed algorithms) with the Server Agent at step 2530. The Server Agent then builds or finds an algorithm to identify the fault, which is received at step 2532.

In any of the above searches for an appropriate algorithm which succeeds (steps 2508, 2512 or 2516), the algorithm is applied at step 2520, as shown in FIG. 25A. The algorithm applying step 2520 is shown in further detail in FIG. 25D. Here, a procedure is followed of distributing the algorithm received by the Server Agent to the involved Target Agents at step 2534, and applying the algorithm at each Target Agent at step 2536. Results of the algorithm being applied are compared at step 2538, and a fault is identified at step 2540. Thus the root cause of the problem can be identified.

The invention claimed is:

1. A control unit for a vehicle comprising:
   a processor configured to execute a first agent of a first subsystem of the vehicle, the first agent including a fault detection agent and a communication agent,
   the fault detection agent configured to monitor performance data of the first subsystem to identify a problem in the first subsystem, to store first candidate fault diagnosis processes corresponding to the first subsystem in a first memory, and to search for a fault diagnosis process which identifies a fault causing the problem in the first subsystem from among the first candidate fault diagnosis processes, and
   the communication agent configured to collaborate with a second agent when a search by the fault detection agent fails to find the fault diagnosis process which identifies the fault, the collaboration with the second agent including searching a second memory which stores second candidate fault diagnosis processes, sending the monitored performance data to the second agent, and exchanging search result data between the first and second agents, wherein
   the second agent is locally executed by the control unit or another control unit for the vehicle.

2. The control unit according to claim 1, further comprising:
   a network interface controller configured to establish a communication link between the first agent and a server agent when the collaboration with the second agent fails to result in finding the fault diagnosis process which identifies the fault,
   the communication agent configured to receive a server candidate fault diagnosis process from the server agent.

3. The control unit according to claim 2, wherein the communication agent is configured to distribute the server candidate fault diagnosis process to the fault detection agent of the first agent and the second agent.

4. The control unit according to claim 3, wherein
   the communication agent receives a result of the second agent applying the server candidate fault diagnosis process, and
   the fault detection agent compares a result of the fault detection agent applying the server candidate fault diagnosis process to the result of the second agent applying the server candidate fault diagnosis process to identify the fault.

5. The control unit according to claim 4, wherein an event log of the identification of the fault is stored in the first memory.

6. The control unit according to claim 2, wherein the server agent is executed by a server operated remotely from the control unit.

7. The control unit according to claim 2, wherein
   the network interface controller is configured to establish a communication link between the first agent, the second agent and the server agent by a network, and the communication agent is configured to receive the server candidate fault diagnosis process from the server agent in response to: (1) the server agent connecting to the network, and (2) the communication agent, in response to the server agent connecting to the network, transmitting the monitored performance data and the search result data exchanged between the first and second agents to the server agent.

8. The control unit according to claim 7, wherein the communication agent is further configured to transmit statistical and probability models of the monitored performance data to the server agent.

9. The control unit according to claim 1, wherein
the second agent corresponds to a second subsystem of the vehicle, and
the second agent is configured to monitor performance data of the second subsystem.

10. The control unit according to claim 9, wherein
the first agent is configured to identify a correlation between the monitored performance data of the first and second subsystems, and
the first agent searches the second memory for the fault diagnosis process which identifies the fault based on the correlation.

11. The control unit according to claim 9, further comprising:
a memory module including the first and second memories as discrete memory banks, wherein the processor is further configured to execute the second agent.

12. The control unit according to claim 1, wherein the first agent further includes a clustering agent configured to generate a statistical model and a probability model from the monitored performance data to predict a probability of a future problem.

13. The control unit according to claim 12, wherein the fault detection agent is configured to compare the monitored performance data of the first subsystem with data from the statistical and probability models of the clustering agent to identify and predict the problem in the first subsystem.

14. The control unit according to claim 1, wherein the search result data includes a result of applying at least a portion of a candidate fault diagnosis process to at least a portion of the monitored performance data.

15. The control unit according to claim 14, wherein the candidate fault diagnosis process includes at least one of (1) reading a selected portion of the monitored subsystem performance data, (2) comparing the monitored subsystem performance data to thresholds, (3) checking a timing requirement of the monitored subsystem performance data, and (4) reporting or logging the monitored subsystem performance data.

16. The control unit according to claim 1, wherein the first agent further includes a learning agent trained on healthy performance data and configured to identify the problem by comparing the monitored performance data to the healthy performance data.

17. The control unit according to claim 1, further comprising:
a network interface controller configured to communicatively link the first agent with the second agent, wherein the second agent is executed by a processor of another control unit.

18. A vehicle including a control unit, the control unit comprising:
a processor configured to execute a first agent of a first subsystem of the vehicle, the first agent including a fault detection agent and a communication agent,
the fault detection agent configured to monitor performance data of the first subsystem to identify a problem in the first subsystem, to store first candidate fault diagnosis processes corresponding to the first subsystem in a first memory, and to search for a fault diagnosis process which identifies a fault causing the problem in the first subsystem from among the first candidate fault diagnosis processes, and
the communication agent configured to collaborate with a second agent when a search by the fault detection agent fails to find the fault diagnosis process which identifies the fault, the collaboration with the second agent including searching a second memory which stores second candidate fault diagnosis processes, sending the monitored performance data to the second agent, and exchanging search result data between the first and second agents, wherein
the second agent is locally executed by the control unit or another control unit for the vehicle.

19. A computer-readable medium storing a program for diagnosing vehicle faults of a vehicle, that, when executed by a computer, performs a method for identifying a fault causing a problem in a vehicle subsystem of the vehicle, the method comprising:
executing, by a control unit of the vehicle, a first agent of a first subsystem of the vehicle, the first agent including a fault detection agent and a communication agent;
monitoring, by the fault detection agent, performance data of the first subsystem to identify a problem in the first subsystem;
searching, by the fault detection agent, for a fault diagnosis process which identifies a fault causing the problem in the first subsystem from among first candidate fault diagnosis processes stored in a first memory corresponding to the first subsystem; and
collaborating, by the communication agent, with a second agent when the searching by the fault detection agent fails to find the fault diagnosis process which identifies the fault, the collaborating including searching a second memory which stores second candidate fault diagnosis processes, sending the monitored performance data to the second agent, and exchanging search result data between the first and second agents, wherein
the second agent is locally executed by the control unit or another control unit of the vehicle.

20. A method for identifying a fault causing a problem in a vehicle subsystem of a vehicle, the method comprising:
executing, by a control unit of the vehicle, a first agent of a first subsystem of the vehicle, the first agent including a fault detection agent and a communication agent;
monitoring, by the fault detection agent, performance data of the first subsystem to identify a problem in the first subsystem;
searching, by the fault detection agent, for a fault diagnosis process which identifies a fault causing the problem in the first subsystem from among first candidate fault diagnosis processes stored in a first memory corresponding to the first subsystem; and
collaborating, by the communication agent, with a second agent when the searching by the fault detection agent fails to find the fault diagnosis process which identifies the fault, the collaborating including searching a second memory which stores second candidate fault diagnosis processes, sending the monitored performance data to the second agent, and exchanging search result data between the first and second agents, wherein the second agent is locally executed by the control unit or another control unit of the vehicle.

* * * * *